(12) United States Patent
Kumar et al.

(10) Patent No.: US 12,075,331 B2
(45) Date of Patent: Aug. 27, 2024

(54) UNIFIED ACCESS CONTROL IMPROVEMENTS

(71) Applicant: Apple Inc., Cupertino, CA (US)

(72) Inventors: Basant Kumar, Bangalore (IN); Krisztian Kiss, Hayward, CA (US); Anikethan Ramakrishna Vijaya Kumar, Karntaka (IN); Nirlesh Koshta, Karntaka (IN); Sridhar Prakasam, Fremont, CA (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 17/508,283

(22) Filed: Oct. 22, 2021

(65) Prior Publication Data

US 2022/0141754 A1 May 5, 2022

(30) Foreign Application Priority Data

Nov. 5, 2020 (IN) .............................. 202041048362

(51) Int. Cl.
*H04W 48/02* (2009.01)
*H04W 60/02* (2009.01)
*H04W 68/00* (2009.01)
*H04W 76/10* (2018.01)

(52) U.S. Cl.
CPC ........... *H04W 48/02* (2013.01); *H04W 60/02* (2013.01); *H04W 68/005* (2013.01); *H04W 76/10* (2018.02)

(58) Field of Classification Search
CPC ... H04W 48/02; H04W 60/02; H04W 68/005; H04W 76/10; H04W 8/245; H04W 48/18; H04W 76/18
See application file for complete search history.

(56) References Cited

U.S. PATENT DOCUMENTS

| 2018/0092024 | A1* | 3/2018 | Ardeli | H04W 48/20 |
| 2019/0159108 | A1 | 5/2019 | Lee et al. | |
| 2019/0174392 | A1 | 6/2019 | Chun | |
| 2020/0336953 | A1 | 10/2020 | Liu et al. | |
| 2021/0051466 | A1* | 2/2021 | Kumar | H04W 8/06 |
| 2021/0092668 | A1* | 3/2021 | Zaus | H04W 60/00 |
| 2021/0360508 | A1* | 11/2021 | Lee | H04W 48/02 |
| 2021/0385727 | A1* | 12/2021 | Ohlsson | H04W 76/19 |

(Continued)

FOREIGN PATENT DOCUMENTS

| CN | 110383894 | 10/2019 |
| EP | 3267756 A1 | 1/2018 |
| WO | 2019194597 | 10/2019 |

(Continued)

OTHER PUBLICATIONS

Extended European Search Report for European Patent Application No. 21206362.2; 10 pages; Mar. 28, 2022.

(Continued)

*Primary Examiner* — Kibrom T Hailu
(74) *Attorney, Agent, or Firm* — Kowert, Hood, Munyon, Rankin & Goetzel, P.C.

(57) ABSTRACT

This disclosure relates to techniques for performing wireless communications in context of unified access control. A UE may enter an update needed state. The UE may detect a pending communication. The UE may access the network using an access category associated with the pending communication. The UE may complete the update.

20 Claims, 12 Drawing Sheets

(56) References Cited

U.S. PATENT DOCUMENTS

2021/0392574 A1* 12/2021 Tiwari .................. H04W 68/12

FOREIGN PATENT DOCUMENTS

WO      2020067749 A1    4/2020
WO      2020091684 A1    5/2020

OTHER PUBLICATIONS

Ericsson "Access Control for RRC-initiated Access Attempts"; 3GPP TSG-RAN WG2 #100 R2-1712532; Reno, USA; 8 pages; Nov. 27-Dec. 1, 2017.
Office Action for CN Patent Application No. 202111302916.9; Jan. 2, 2024.
Extended European Search Report for EP 24156136.4; Apr. 11, 2024.
"3rd Generation Partnership Project; Technical Specification Group Core Network and Terminals; Non-Access-Stratum (NAS) protocol for 5G System (5GS); Stage 3; (Release 17)"; Sep. 2020.
APPLE "Clarification of access control checks for specific procedures initiated in 5GMM-CONNTECTED mode with RRC Inactive"; 3GPP TSG-CT WG1 Meeting #127-e C1-207343; Nov. 16, 2020.

\* cited by examiner

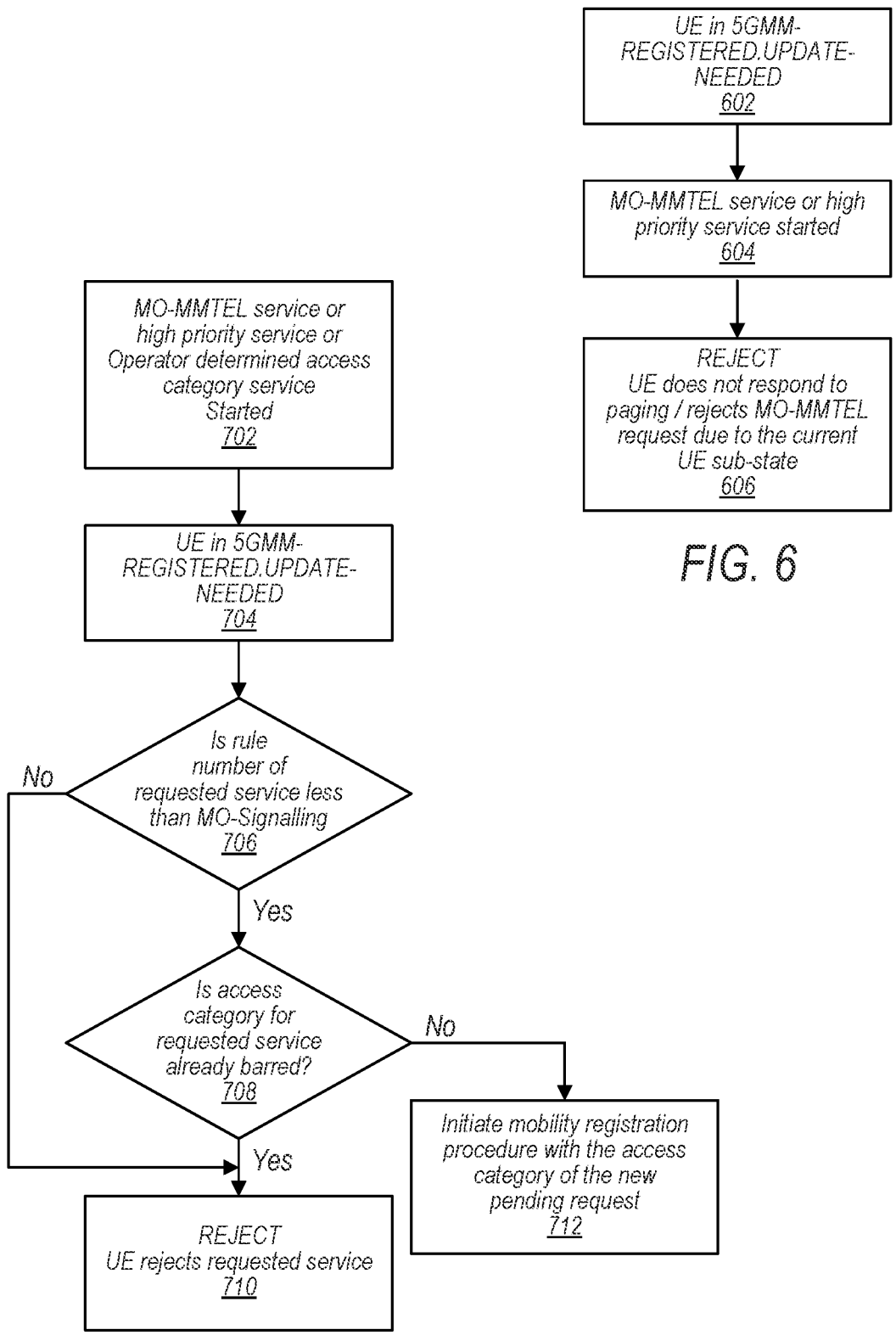

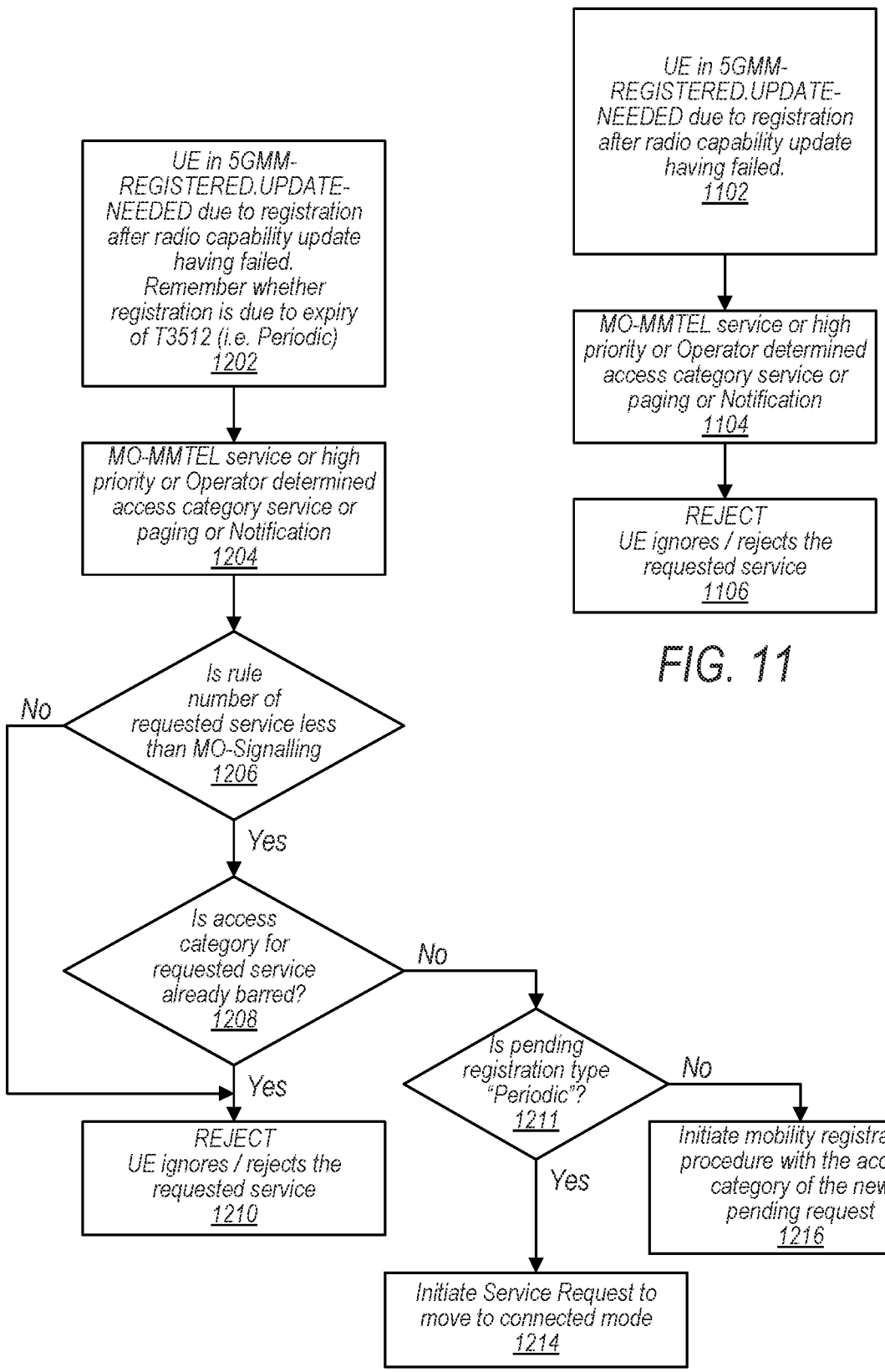

| Rule # | Access identities | Access categories | RRC establishment cause is set to |
|---|---|---|---|
| 9 | UE NAS initiated 5GMM connection management procedure or 5GMM NAS transport procedure | Access attempt is for MO data | 7(=MO_data) |

FIG. 14

| Rule # | Access identities | Access categories | RRC establishment cause is set to |
|---|---|---|---|
| 5 | 0 | 7(=MO_data) | Mo-Data |

FIG. 15

| Rule # | Type of access attempt | Requirement to be met | Access Category |
|---|---|---|---|
| 1 | Response to paging or NOTIFICATION over non-3GPP access; 5GMM connection management procedure initiated for the purpose of transporing an LPP message without an ongoing 5GC-MO-LR procedure; Access attempt to handover of ongoing MMTEL voice call, MMTEL video call or SMSoIP from non-3GPP access. Access attempt for purpose of sending SOR / UPU acknowledgement | Access attempt is for MT access, or handover of ongoing MMTEL voice call, MMTEL video call or SMSoIP from non-3GPP access | 0 (=MT_acc) |

FIG. 16

UNIFIED ACCESS CONTROL IMPROVEMENTS

PRIORITY CLAIM

This application claims benefit of priority to Indian Application No. 202041048362, titled "Unified Access Control Improvements", filed Nov. 5, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to unified access control.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be access control for different types of access categories. Improvements in the field are desired.

SUMMARY

Embodiments are presented herein of, inter alia, systems, apparatuses, and methods for performing radio resource control connection procedures for rapidly moving wireless devices in a wireless communication system.

As noted above, the number of use cases for wireless networks communicating with different classes of user equipment devices (UEs) with widely variable capabilities and usage expectations are growing. One direction in expansion of possible use cases supported by wireless communication techniques may include increasing use of techniques for access control. Under some circumstances, a higher priority service may be barred based on the state of a connection. Accordingly, the techniques described herein include techniques for a UE (e.g., in communication with a network) to access services without undue delay.

For example, a UE may establish communication with a cellular network. The UE and/or network may initiate an update with respect to the UE's connection. The UE may not immediately complete the update, e.g., due to unified access control barring of a first access category associated with the update. While the update is pending, the UE may detect a pending communication. In response, the UE may determine a second access category associated with the pending communication and whether that second access category is currently barred. If the second access category is not currently barred, the UE may initiate access with the network according to the second access category. The UE and the network may exchange data related to the pending communication and may complete the update.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6-13 illustrate aspects of improved UAC, according to some embodiments; and FIGS. 14-17 illustrate aspects of clarifications related to access categorization, according to some embodiments.

Figure 1:
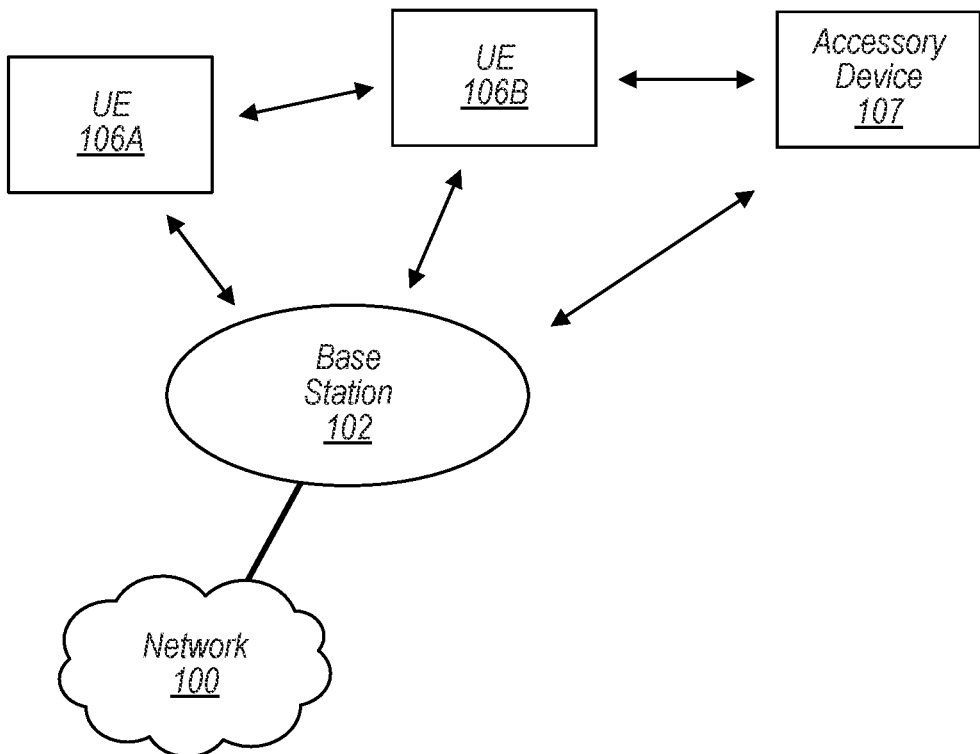
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control
5GS: 5G System
NAS: Non-access stratum Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
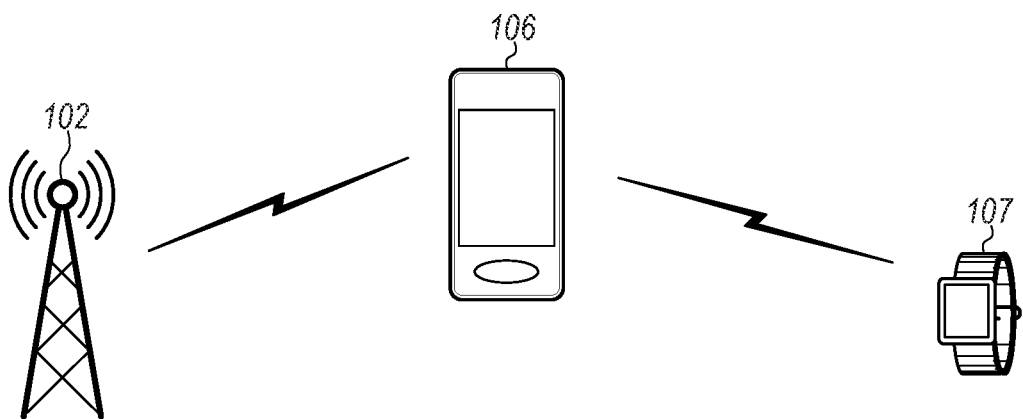
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
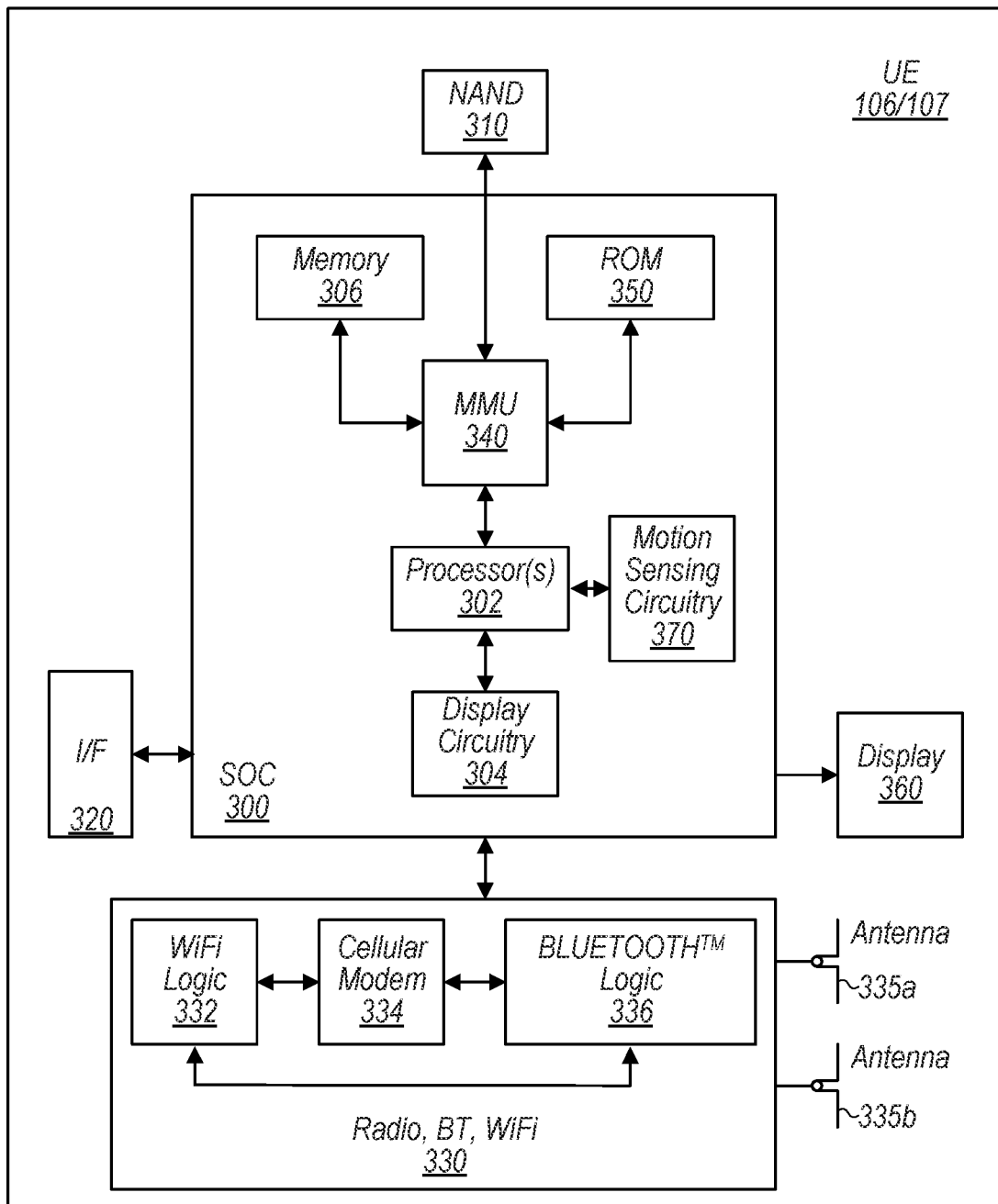
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
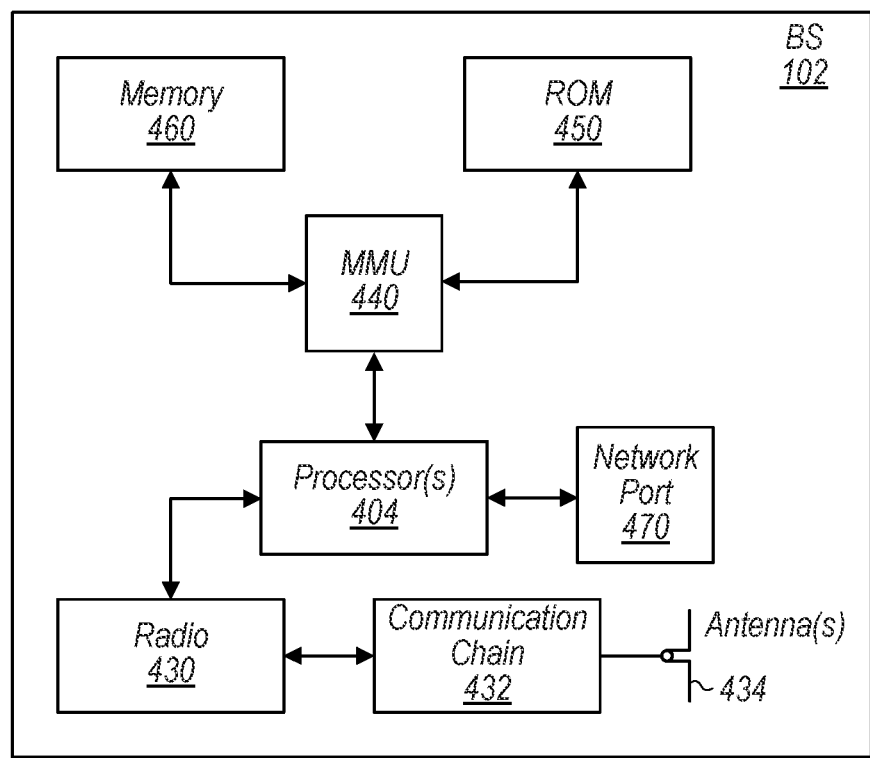
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
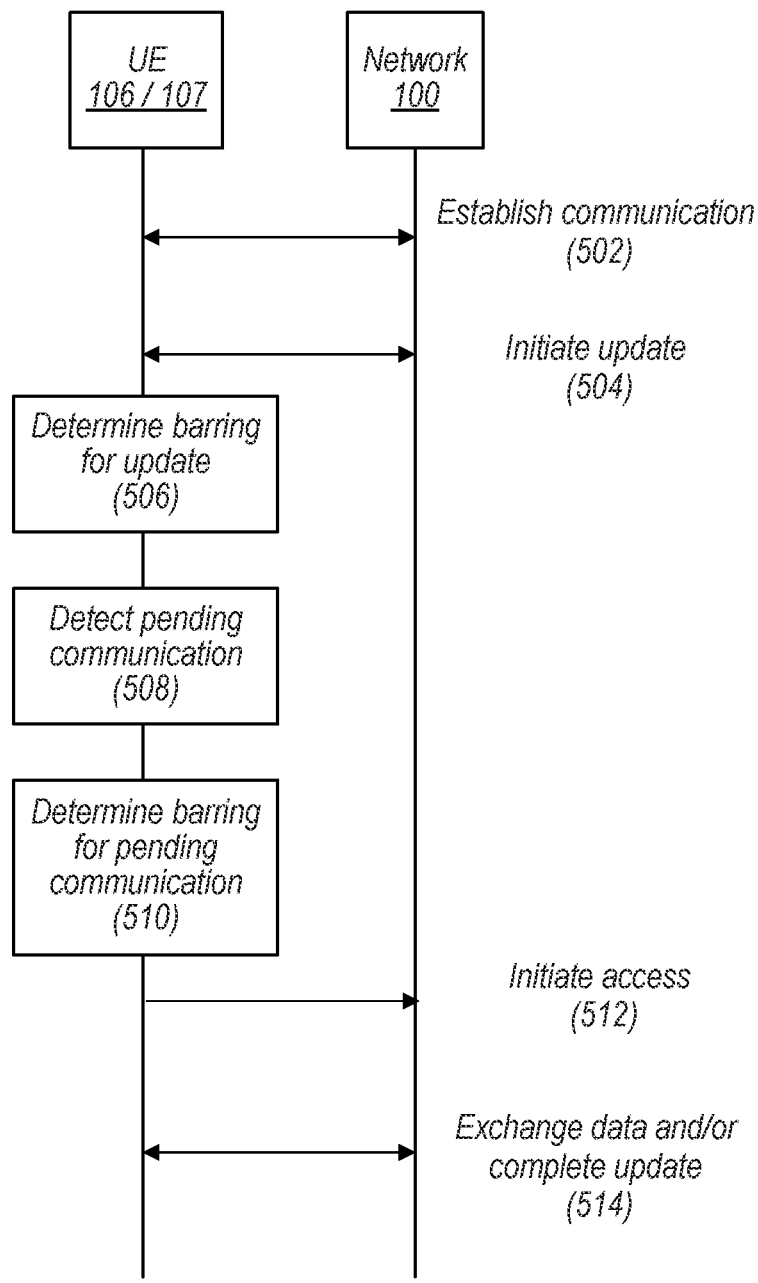
FIG. 5 is a communication flow diagram illustrating an example method for communication according to unified access control (UAC), according to some embodiments.

FIG. 5—Communication Flow Diagram

The Unified Access Control (UAC) feature in 5G systems (5GS) may ensure that previously distributed handling of access barring (e.g., as in LTE) may be streamlined and handled in a centralized manner. Distinct access categories may have been specified and the barring for these categories may be handled independently. Accordingly, one category being barred may not affect other categories and hence attempts to access those allowed services may be possible and allowed.

As per 3GPP technical specification (e.g., (TS) 24.501 table 4.5.2A.2 and/or table 4.5.2.2, among other sections), the different access categories may (e.g., each) be associated with a rule number and may also implicitly have a priority depending on the numeric value associated with the rule. In some embodiments, the lower the numeric value of the rule, the higher the priority of the service. When at a given point in time there are multiple services mapping to different access categories pending with the UE in idle mode, the specification may indicate for the UE to use the access category associated with the least numeric value rule for the connection establishment. In some cases, this may result in the highest priority service being used to determine whether or not the UE is barred from accessing the network. However, as noted above, in some embodiments, a network (e.g., a base station) may bar access categories without regard to the numeric value of the corresponding rules. For example, at some times, a first access category associated with a rule with a lower numeric value (e.g., rule 4) may be barred while a second access category associated with a rule with a higher numeric value (e.g., rule 5) may not be barred.

However, there may be instances where in spite of a higher priority service (e.g., a relatively low rule number) not being barred, the current specification ends up restricting initiation of the procedure based on a state of the UE, e.g., with respect to 5G mobility management (5GMM). For example, a UE in an update needed state (e.g., in 5GMM-REGISTERED.UPDATE-NEEDED sub-state of 5GMM sub-layer) may be restricted under certain circumstances. Similarly, in some cases an establishment cause may be used which may result in the network not prioritizing the request. Additionally, there may be cases where a UE initiates a service request when the UE and network are not in sync, which may lead to issues such as the UE being asked to send measurement reports for a radio access technology that has already been disabled or the UE being asked to move to a radio access technology which it has already disabled, etc.

FIG. 5 is a communication flow diagram illustrating an example method for performing communication in context of unified access control, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

The UE and the network may establish communication (502), according to some embodiments. The UE and the network may communicate using one or more radio access technologies (RATs), e.g., including NR. The UE and the network may communicate using one or more access category.

The network may provide control information to the UE. For example, the network may indicate which access categories are currently barred and which access categories are not. Similarly, the network may indicate probabilistic barring factors for barred access categories, according to some embodiments. Such control information related to barring may be broadcast, e.g., via system information block, master information block, or similar broadcast information.

The UE may enter an idle mode, according to some embodiments.

The UE and/or the network may initiate an update related to the connection between the UE and the network (504), according to some embodiments. The update may be a mobility update or a capability update, among various possibilities. The update may be associated with a periodic registration, e.g., owing to the expiry of timer T3512 to refresh the UE's registration with the network, as defined by 3GPP specification TS 24.501 for 5GMM sub-layer. The update may be an aperiodic update (e.g., mobility registration when connected to a 5G core).

The update may be initiated while the UE is in the idle mode. Performing the update may include the UE gaining access to the network (e.g., base station) and registering (e.g., or re-registering) with the network (e.g., base station and/or core network elements like AMF, session management function (SMF), etc.). Thus, the UE may not complete the update prior to accessing the network and entering a connected mode owing to certain restrictions for connection establishment, according to some embodiments.

Various types of updates are possible. For example, the update may be related to one or more of: notifying the network of a change in the radio capability of the UE; a change in the network slices the UE intends to use; negotiating a change in discontinuous reception (DRX) parameters; and/or periodically refreshing the registration with the network, etc.

The UE may determine whether or not a first access category associated with the update is currently barred (506), according to some embodiments. For example, the UE may base this determination on the most current barring information received from the network. Depending on the determination, the UE may or may not access the network and thus may or may not complete the update (e.g., at the present time). Accessing the network may include transmitting a service request and/or performing registration (e.g., re-registration).

For example, the UE may determine that the update is associate with access category 9 (e.g., mobile originated (MO) internet protocol (IP) multimedia subsystem (IMS) registration related signaling, among various possibilities). Access category 9 may be associated with rule 4.1, among various possibilities. Thus, the UE may determine whether the access category is currently barred, e.g., whether rule 4.1 is currently allowed to access the network. In response to a determination that rule 4.1 is currently barred, the UE may determine not to access the network. In other words, if the rule and/or access category associated with performing the update (e.g., registration) is barred, the UE may not initiate access, and thus may not complete the update until the UE accesses the network at a later time.

In some embodiments, barring may be (e.g., in part) probabilistic, e.g., using a barring factor provided by the network. For example, a network may publish (e.g., broadcast via a system information block) a barring factor for a barred access category. The barring factor may be access category specific, or a barring factor may be applied to all barred access categories. Any UE attempting access according to a barred access category may draw a random number and compare the random number to the barring factor to determine whether or not to access the network. For example, any UE drawing a random number lower than the (e.g., applicable) barring factor may access the network; a UE drawing a random number greater than or equal to the barring factor may not.

In response to a determination that the access category is barred (e.g., and that the UE's random number does not permit access, if applicable), the UE may enter a state (e.g., a substate) associated with an uncompleted update. For example, the UE may enter a state such as 5GMM.REGISTERED.UPDATE-NEEDED. The UE may store various information associated with entering the update needed state. For example, the UE may store information related to the cause of entering the update needed state such as whether or not entering the update needed state is a result of a failed periodic registration. The UE may store information about the cause of entering the update needed state.

In response to a determination that the access category is not barred (e.g., or that the UE's random number does permit access, if applicable), the UE may access the network (e.g., according to the first access category associated with the update and/or registration, e.g., rule 4.1 in the example described above) and complete the update.

In some embodiments, the update may fail, be delayed, or the update process may last for a period of time prior to successful completion, e.g., due to barring of the access category and/or other factors. Any number of attempts to complete the update process may occur.

The UE may detect or determine that a communication is pending (508), according to some embodiments. This may occur while the update is pending (e.g., due to access barring of the access category of the update or otherwise prior to successful completion of the update). The pending communication may be an uplink and/or downlink transmission. In other words, the pending communication may be an uplink communication for transmission by the UE to the network and/or a downlink communication for transmission by the network to the UE. In some embodiments, the UE may not be able to transmit and/or receive the pending communication prior to completing the update/registration.

In some embodiments, the pending communication may be a MO communication. The pending communication may be associated with a service and/or an application executing on the device. For example, the pending communication may be multimedia telephony (MMTEL), e.g., an MMTEL call.

In some embodiments, the pending communication may be a mobile terminated (MT) communication. For example, the UE may receive a page indicating that the UE should exchange data (e.g., uplink and/or downlink) for a service and/or an application associated with the page. Thus, the UE may determine an access category associated with the service/application.

In some embodiments, the UE may detect or determine that the communication is pending based on a notification message. For example, a notification message may be transmitted to the UE via a non-3GPP access (e.g., WLAN such as Wi-Fi). The notification message may indicate that uplink and/or downlink communication is pending for the UE over a 3GPP access (e.g., cellular).

The UE may determine whether or not a second access category associated with the pending communication is barred (510), according to some embodiments. This may occur while the update is pending (e.g., due to access barring of the access category of the update or otherwise prior to successful completion of the update).

For example, the UE may determine a second access category associated with the pending communication. Then, the UE may determine whether the second access category associated with the pending communication is barred (e.g., based on control information). The second access category associated with the pending communication may be different than the first access category associated with the update. Thus, the determination of barring for the pending communication may be different than the determination of barring for the update. However, it will be appreciated that in some cases the second access category associated with the pending communication may be the same as the first access category associated with the update or that even if the two access categories are different they may both have the same barring (e.g., both barred or both not barred). Thus, the determinations may be the same in some cases.

For example, pending communication that is a response to a page may be associated with access category 0 (e.g., Rule 1). The UE may determine whether or not access category 0 is currently barred. Similarly, data for an MMTel service may be associated with access category 4 (voice) or 5 (video). Thus, the UE may determine whether the corresponding access category is barred.

As noted above, the UE may also draw a random number and compare the random number to a barring factor, e.g., if the access class is barred with a barring factor.

In response to determining that the second access category associated with the pending communication is not barred (e.g., or that the UE's random number allows access given the barring factor), the UE may access the network according to the access category (512), according to some embodiments. For example, the UE may transmit a service request, register, or reregister with the network using the second access category associated with the pending communication. Registration or reregistration may be performed via a mobility registration procedure.

In some embodiments, the UE may select a way to access the network (e.g., via a service request or a registration) depending on details of how or why the UE entered the update needed state. For example, if the UE entered the update needed state due to a failure (e.g., due to barring and/or other factors) of a periodic registration, then the UE may initiate a service request. If the UE entered the update needed state due to a failure (e.g., due to barring and/or other factors) of an aperiodic registration (e.g., mobility registration), then the UE may initiate a registration (e.g., a mobility registration).

In some embodiments, the UE may enter a connected mode upon accessing the network.

The UE and the network may exchange data and/or complete the pending update (514), according to some embodiments. For example, the UE and the network may complete the update. Completing the update may result in the UE and the network having consistent radio capability information for the UE. For example, in the case of a capability update related to the UE disabling a RAT, the network may update its records to reflect the disabling of the RAT (e.g., the network will no longer schedule the UE to use that RAT until a subsequent update occurs). Then, after the update is complete, the UE and the network may use the updated configuration to exchange data for the pending communication.

In some embodiments, in response to completing the update, the UE may enter a normal service state (e.g., 5GMM.REGISTERED.NORMAL-SERVICE). The UE may enter a connected mode or idle mode.

In some embodiments, if (e.g., in 510) the UE determines that the access category associated with the pending communication is barred (e.g., or draws a random number that does not allow access given an applicable barring factor), then the UE may not initiate access (e.g., in 512). Similarly, the UE and network may not complete the update using the access category associated with the pending communication (e.g., in 514). Instead, the UE may wait for either or both of the first access category associated with the update or the access category associated with the pending communication to become unbarred. At that time, the UE may register, complete the update, and perform the data exchange for the pending communication.

In some embodiments, if a second pending communication associated with a different access category becomes pending, the UE may further determine if the access category of the second pending communication is barred. If not, the UE may use that access category to complete the update.

In some embodiments, the second access category associated with the pending communication may be lower priority than the first access category associated with the update. Nevertheless, the second access category associated with the pending communication may not be barred even though the first access category associated with the update is barred. Accordingly, the UE may gain access to the network according to the second access category associated with the pending communication even though the first access category associated with the update is barred. The UE may use the second access category associated with the pending communication to gain access to the network. Upon gaining access, the UE may complete the update and then perform the pending communication.

Although FIG. 5 has been primarily discussed with respect to an update needed state, it will be appreciated that a similar method may apply to a registration needed state. For example, the method of FIG. 5 may apply to a UE in 5GMM.DEREGISTERED.INITIAL-REGISTRATION-NEEDED. A UE in such a state may detect a pending communication (e.g., similar to 508, e.g., without having previously established communication in 502 or performing related actions in 504-506) and may proceed as discussed above with respect to 510-514.

FIGS. 6-13—Communication with Improved Access Control

In some example scenarios, a UE may be registered in 5GS in a 5GMM idle mode. The UE may move to a new tracking area not in the current registration area. As a result, the UE may initiate a mobility registration procedure. At the same time there may be an MO-MMTEL voice call pending. As per the existing specification MO-MMTEL services may have a rule number of 5 and UE specific procedure has a rule number of 9. Hence as per the specification the access category associated with the lower rule number, e.g., MO MMTEL voice call may be used for the connection establishment. Once the UE moves to connected mode, the registration procedure may not be subject to access barring check based on the below specification reference from TS 24.501:

"NOTE 1: 5GMM specific procedures initiated by NAS in 5GMM-CONNECTED mode are not subject to access control, e.g. a registration procedure after PS handover will not be prevented by access control (see subclause 5.5)."

Hence in a use case where an MMTEL service is also pending at the point of initiation of registration, the access category of the lower rule may be used and the registration itself may not subject to access barring check.

However, in some embodiments, the UE may perform a different sequence of operations. An example is shown in FIG. 6, according to some embodiments. The UE may attempt mobility registration (e.g., due to the change in tracking area) and the access check for the MO-Signaling category (e.g., category 3, rule 8) fails (e.g., due to barring of the access category). Thus, the UE's 5GMM state moves to 5GMM.REGISTERED.UPDATE-NEEDED (602), according to some embodiments. At this time, the UE may receive a request to start an MO-MMTEL service or some other high priority service (604) after the UE has entered the 5GMM.REGISTERED.UPDATE-NEEDED sub-state. In some embodiments, the UE may receive a page related to such a service. The UE may reject the communication due to barring (606), according to some embodiments. For example, as per the existing specification the UE may not honor MMTEL services in spite of them belonging to a different and higher priority access category (e.g., category 4, rule 5). Similarly, the UE may not respond to a page, e.g., due to the UE not yet having successfully updated its registration status with the network. For example, in spite of the page being associated with a higher priority access category the UE's state (e.g., 5GMM.REGISTERED.UP-DATE-NEEDED) and/or its update status may block initiation of a Service Request procedure (e.g., via UAC barring). In some embodiments, when in the 5GMM.REGISTERED.UPDATE-NEEDED state, the UE may not initiate any procedure other than mobility registration and the mobility registration in turn may be allowed only when barring for the signaling access category is alleviated. Thus, MMTEL services like voice call/video call/SMS etc. may fail in this and similar scenarios in spite of them belonging of access categories of higher priority and being allowed.

FIG. 7 illustrates a different approach (e.g., an example of the method of FIG. 5) in the case of a MO communication, according to some embodiments. Specifically, FIG. 7 illustrates an example in which the UE performs a check for rule number of a requested service and then decides on the next step.

As shown, a MO-MMTel service, high priority service, or a service associated with Operator Determined Access Category (ODAC) may be started (702) while the UE is in an update needed state (704), according to some embodiments. In response, the UE may check if the pending service has a UAC rule number less than the rule associated with MO-Signaling (706), according to some embodiments.

If the rule for the pending service is not lower than the rule for MO-signaling, the UE may reject the request (710), according to some embodiments. For example, the UE may not initiate access for the pending service. Similarly, the UE may not respond to a page associated with the pending service. For example, the UE may not respond to paging if any of the following conditions is not met: the UE is in an appropriate 5GMM sub-state, the UE is registered in a current tracking area, and the UE has an appropriate update status to be able to initiate a service request procedure. For example, the UE may not meet these criteria when in 5GMM.REGISTERED.UPDATE-NEEDED sub-state), and thus may reject the request.

Alternatively, if yes (e.g., the rule number is lower than MO-signaling), the UE may check if the access category for the associated service is barred (708), according to some embodiments.

If the access category for the service is barred, the UE may reject the request (710), as discussed above.

If the access category for the service is not barred, the UE may attempt access (e.g., connection establishment) for mobility registration with this new access category (712), according to some embodiments. The UE may initiate signaling, if any, for the pending procedure/update after the completion of the mobility registration procedure.

Figure 8:
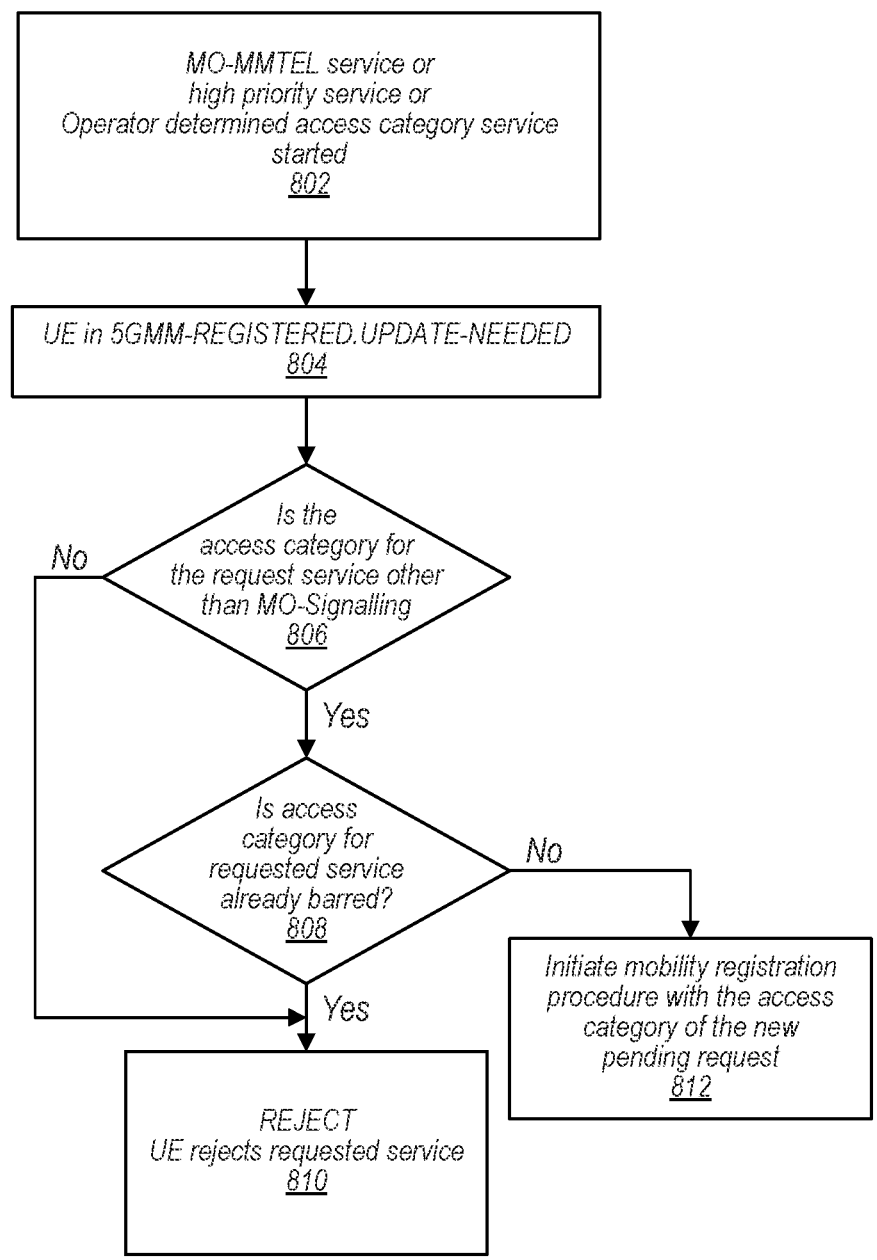

FIG. 8 illustrates a different approach (e.g., an example of the method of FIG. 5) in the case of a MO communication, according to some embodiments. In the example of FIG. 8, a UE may check the access category of the requested service and decide on the next step.

As shown, a MO-MMTel or high priority service may be started (802) while the UE is in an update needed state (804), according to some embodiments. In response to being in an update needed state (e.g., 5GMM.REGISTERED.UPDATE-NEEDED), the UE may check if the access category for the pending service is different from MO-Signaling (806), according to some embodiments.

If the access category for the pending service is the same as MO-Signaling, the UE may reject the request (810) (similar to as discussed above regarding 710), according to some embodiments.

If the access category for the pending service is different than MO-Signaling, the UE may check if the access category for the associated service is barred (808), according to some embodiments.

If the access category for the pending service is barred, the UE may reject the request (810).

If the access category for the pending service is not barred, then the UE may attempt connection establishment for mobility registration (812), according to some embodiments. The UE may attempt access with the access category of the pending service and may initiate signaling, if any, for the pending procedure/update after the completion of the mobility registration procedure.

It will be appreciated that the approaches of FIGS. 7 and 8 may be applicable to other updates. For example, these approaches may be applied to a UE in 5GMM.DEREGIS-TERED.INITIAL-REGISTRATION-NEEDED or other states relating to a pending update.

Other examples of the method of FIG. 5 may be related to paging and/or notifications received by the UE. The current specification may ask the UE to initiate a service request when receiving paging or notification in state 5GMM.REGISTERED.UPDATE-NEEDED state. For example, TS 24.501 may describe the current expected UE behavior in section "5.1.3.2.1.4.8 5GMM-REGISTERED.UPDATE-NEEDED" as follows: "No 5GMM procedure except: a) registration procedure for mobility and periodic registration update; and b) service request procedure as a response to paging or notification shall be initiated by the UE in this substate." Further, section "5.2.3.2.7 UPDATE-NEEDED" state that "The UE: a) shall not send any user data; b) shall not send signaling information, unless it is a service request as a response to paging or to initiate signaling for emergency services or emergency services fallback".

However, this aspect of the standard may lead to issues of mismatch and in some cases even rejection by the network if the UE context is not updated in the access and mobility management function (AMF). For example, since the registration procedure previously was not completed, the UE and the network may assume different capabilities of the UE. In one example scenario, illustrated in FIG. 9, a UE may be successfully registered in a first tracking area (e.g., TA1). The UE may disable EUTRA capability, which may be a radio capability change. The UE may initiate a mobility registration procedure to update the network. However, the mobility update procedure may fail (e.g., due to UAC barring). Thus, the UE may move to an update needed state (e.g., 5GMM-REGISTERED.UPDATE-NEEDED) (902). The UE may receive a paging/notification message (904). As per existing specification (906), may initiate a service request procedure. In response to the service request, the network may redirect the UE to EUTRAN. As a result, the UE may be in an abnormal scenario where it is unable to handle the redirection due to having disabled EUTRA. More such abnormal cases may be seen if the UE initiates Service Request when in UPDATE-NEEDED sub-state.

Figures 9, 10:
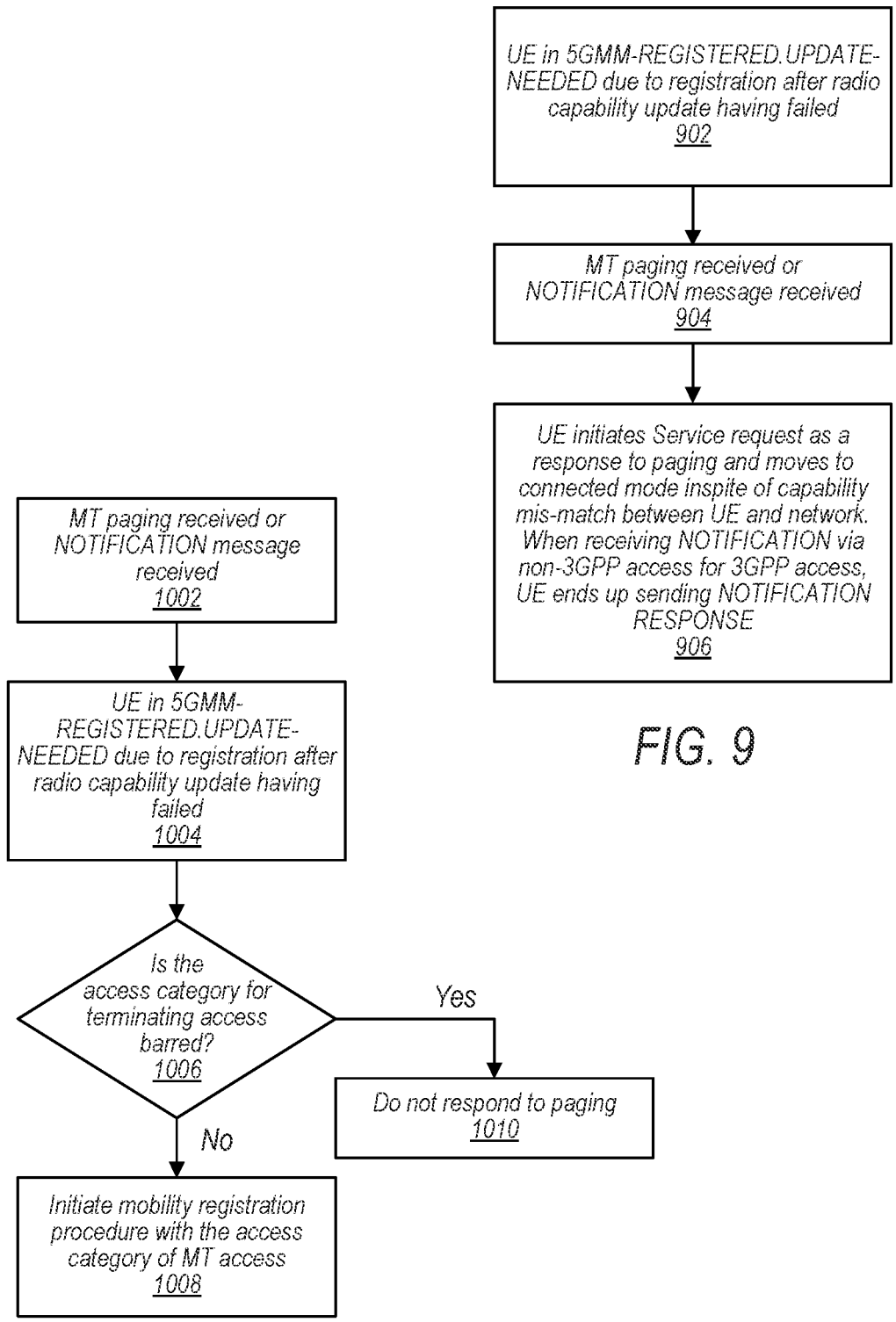

FIG. 10 illustrates a method of communication (e.g., an example of the method of FIG. 5), in which, when paging/notification is received, a UE may initiate mobility registration procedure if the access category for MT services are not barred, according to some embodiments.

As shown, a MT paging or notification message may be received by the UE (1002) while the UE is in an update needed state (1004), according to some embodiments. The update needed state may be due to a radio capability update having failed (e.g., the UE may have disabled EUTRA as discussed above).

The UE may check if the access category for MT access is barred (1006), according to some embodiments. For example, MT access may be associated with access category 0 and rule 1. The paging or notification message may indicate MT access.

If the access category for MT access is barred, the UE may not respond to the page/notification (1010), according to some embodiments. The UE may wait for the access category for MT access to become unbarred or for the UE to enter connected mode prior to responding to the page or performing the communication indicated by the page/notification (e.g., receiving downlink data over the 3GPP access).

If the access category for MT access is not barred, the UE may initiate a registration (e.g., mobility registration) with the access category for MT access (1008), according to some embodiments. For example, the UE may access the network, complete the update, and/or perform the communication indicated by the page/notification (e.g., receiving downlink data over the 3GPP access).

Further examples of handling notification messages are envisioned. The existing specification (e.g., TS 24.501) may indicate certain behavior for a UE in 5GMM-REGISTERED.UPDATE-NEEDED on 3GPP access. When receiving a NOTIFICATION message for 3GPP via non-3GPP access, the UE may send a NOTIFICATION RESPONSE indicating failure to establish connection via 3GPP access. But this may be inconsistent with other aspects of the expected UE behavior. For example, the NOTIFICATION message over non-3GPP access for 3GPP access may serve as a means to save paging resources for the network and/or as an alternate means to ask a UE in 5GMM.IDLE mode to move to 5GMM.CONNECTED mode. A NOTIFICATION message may be similar to a paging message in some respects. Hence it may be inconsistent that the UE behaves differently for paging and NOTIFICATION messages when in 5GMM.REGISTERED.UPDATE-NEEDED sub-state.

As shown in FIG. 11, a UE may enter an update needed state as a result of a failed radio capability update (1102), according to some embodiments. The failure may occur during The UE may determine that a communication is pending (1104). The communication may be of an MO-MMTEL service, a high priority service, an operator determined access category service (e.g., access categories 32-63, subject to rule 3), paging, or a notification. The UE may ignore/reject the requested service (1106), according to some embodiments. For example, the UE may not initiate access based on a UAC check for MO procedures and/or based on the 5GMM sub-state. Thus, the UE may not update status for MT services (e.g., in response to paging or notification), among various possibilities.

In some embodiments, a UE in the above scenario, may either initiate Service Request or Mobility Registration via 3GPP access, e.g., depending on whether it was failure of periodic registration or mobility registration that led to the UE moving to the update needed state. In more detail, special handling in case of Periodic Registration failing UAC checks may be as described below. For example, if the UE moved to 5GMM-REGISTERED.UPDATE-NEEDED due to access checks failing for a previous mobility and periodic registration update procedure whose 5GS registration type IE indicated "periodic registration updating", the UE may follow these procedures. In cases where a UE moved to 5GMM.REGISTERED.UPDATE-NEEDED state due to periodic registration failing UAC checks, the UE may determine whether to transmit a service request.

As a first possibility, the UE may potentially send a Service Request if the rule number associated with the service/pending communication evaluates to a value lesser than the rule number associated with MO-Signalling. In other words, the UE may send the service request if the pending communication is higher priority than MO signalling. The UE may initiate a service request procedure in response to a request to establish connection for services whose associated rule number is lower than the rule number associated with UE NAS initiated 5GMM specific procedures as specified in table 4.5.2.2 of TS 24.501 and according to the criteria specified in section 4.5 of TS 24.501.

As a second possibility, the UE may potentially send a Service Request for any access categories except MO-Signalling. In other words, if the access category of the service/pending communication is different than MO-signaling, the UE may send a service request.

Additional factors may be considered in either possibility, according to some embodiments.

Further, upon successful completion of the Service Request procedure, the UE may move to a normal service state (e.g., 5GMM.REGISTERED.NORMALSERVICE). In the normal service state, the UE may not perform periodic registration.

Alternatively, the UE may stay in a normal service state (e.g., 5GMM.REGISTERED.NORMALSERVICE) after periodic registration failing UAC checks. The UE may remember (e.g., via implementation of the UE) that a periodic registration is pending. Thus, the UE may behave as mentioned above (e.g., determine whether to transmit a service request according to either the first or second possibility).

FIG. 12 illustrates an example of the UE operating according to the first possibility, according to some embodiments. As shown, a UE may enter an update needed state (1202). The update needed state may be in response to a radio capability update failure. The UE may store information about the failure, e.g., including whether the failure (and hence the update needed state) is due to a periodic registration failure. For example, a failure related to expiration of a timer related to periodic registration (e.g., T3512) may be considered a periodic registration failure.

While in the update needed state (e.g., while the update is pending), the UE may determine that a communication is pending (1204), according to some embodiments. The communication may be of an MO-MMTEL service, a high priority service, an operator determined access category service (e.g., access categories 32-63, subject to rule 3), paging, or a notification.

As discussed in the first possibility, the UE may determine if the rule number associated with the requested service/pending communication is lower than that of MO-signaling (1206), according to some embodiments. If not, the UE may reject the communication (1210, e.g., as discussed above regarding 710).

If the rule number associated with the requested service/pending communication is lower than that of MO-signaling, then the UE may determine whether the access category is barred (1208), according to some embodiments. If so, the UE may reject the communication (1210).

If not, the UE may determine (e.g., based on information stored at 1202) if the pending registration/update is associated with a failure of a periodic registration (1211), according to some embodiments. For example, the UE may determine that the failure is related to periodic registration if the UE moved to 5GMM-REGISTERED.UPDATE-NEEDED due to access checks failing for a previous mobility and periodic registration update procedure whose 5GS registration type IE indicated "mobility registration updating".

If the pending registration/update is associated with a failure of a periodic registration, then the UE may initiate a service request (1214), according to some embodiments. The UE may move to a connected mode, complete the update and/or registration. The UE may exchange data for the pending service/communication.

If the pending registration/update is not associated with a failure of a periodic registration, then the UE may initiate a mobility registration procedure (1216), according to some embodiments. The UE may move to a connected mode, complete the update and/or registration. The UE may exchange data for the pending service/communication.

Thus, the UE may initiate a mobility and periodic registration update procedure in response to a request to establish connection for services whose associated rule number is lower than the rule number associated with UE NAS initiated 5GMM specific procedures as specified in table 4.5.2.2 and according to the criteria specified in section 4.5.

Figure 13:
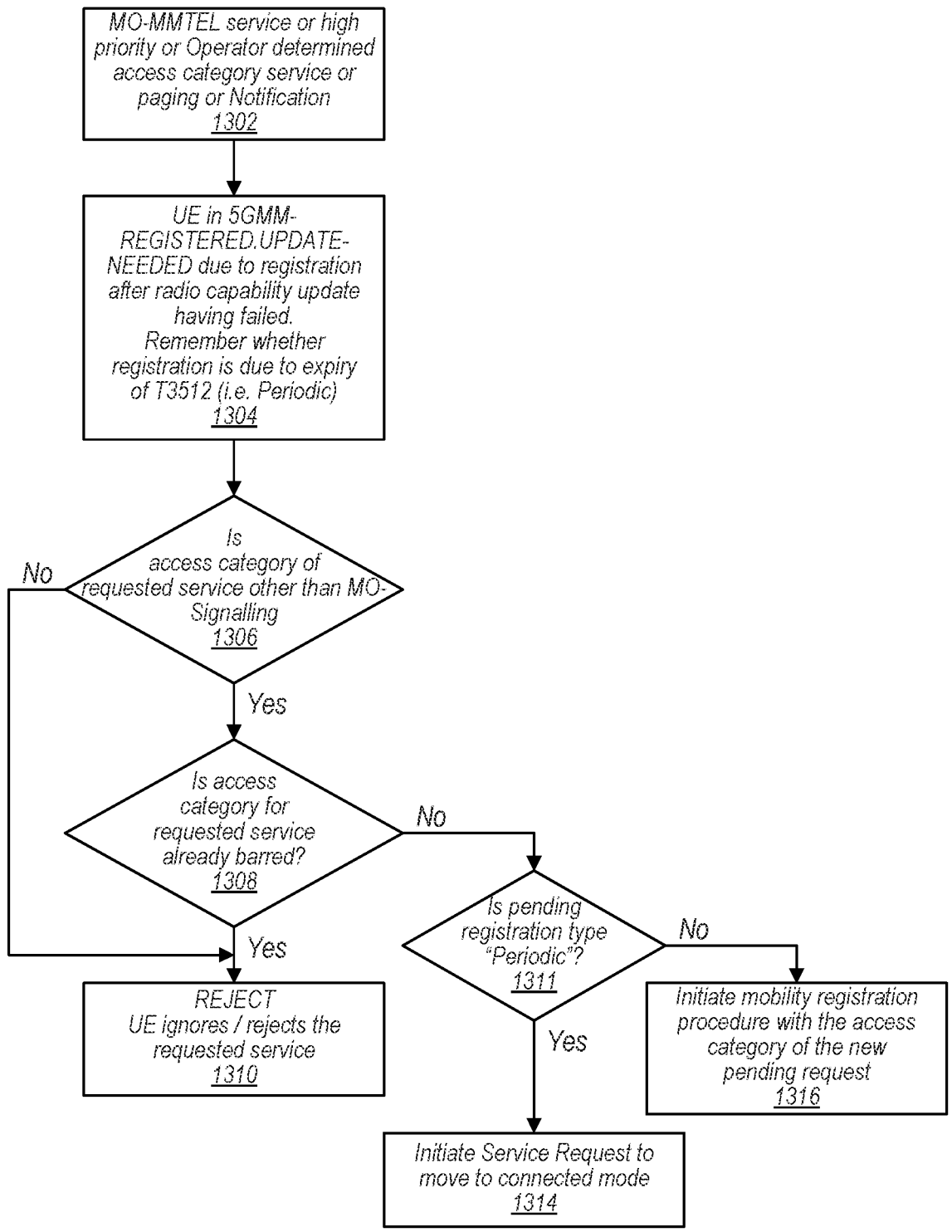

FIG. 13 illustrates an example of the UE operating according to the second possibility, according to some embodiments. As shown, a UE may enter an update needed state (1302) and determine that a communication is pending (1304) (e.g., as discussed above regarding 1202 and 1204), according to some embodiments.

As discussed in the second possibility, the UE may determine if the access category associated with the requested service/pending communication is different than that of MO-signaling (1306), according to some embodiments. If it is not different, the UE may reject the service (1310), e.g., as describe above with respect to 1210. If the access category is different than MO signaling, the UE may proceed to evaluate other factors (1308, 1311) and initiate a service request (1314) or mobility registration (1316), e.g., as discussed above with respect to 1208, 1211, 1214, and 1216.

FIGS. 14-17—Clarifying Access Categories

The current specification (e.g., TS 24.501's section 4.5) may not talk about the access category to be used for the following example use cases:

A first case may be an uplink (UL) NAS transport message with a steering of roaming (SOR) transparent container. The SOR container may be or include a payload container information element (IE). The IE may indicate the UE's acknowledgement of successful reception of SOR information sent in a downlink DL NAS transport message via a SOR transparent container from the network.

A first case may be an UL NAS transport message with a UE parameters update (UPU) transparent container. The UPU container may be or include a payload container IE. The IE may indicate the UE's acknowledgement of successful reception of UPU data sent in DL NAS transport message via a UPU transparent container from the network.

FIG. 14 illustrates an example (e.g., similar to Table 4.5.2.2: Mapping table for access categories) of an access category selected for a UL NAS (e.g., either of the above examples, among various possibilities), according to some embodiments. As shown, such UL NAS may be prioritized according to rule 9.

This may lead to delays in some scenarios. For example, consider the scenario that a UE is registered and in idle mode and that all access categories except 0 and 2 may be barred (e.g., rules 1 and 2). If the network sends a DL NAS transport with a SOR transparent container, the UE may (e.g., attempt to) send a UL NAS transport with SOR acknowledgement. However, RRC connection failure may be indicated by lower layers (e.g., because access according to rule 9 is barred). Thus, the UE may try NAS signaling connection recovery to resend UL NAS transport and according to the table of FIG. 14.

FIG. 15 illustrates an example (e.g., similar to Table 4.5.6.1: Mapping table for access identities/access categories and RRC establishment cause when establishing N1 NAS signaling connection via NR connected to 5GCN, or similarly Table 4.5.6.2) of the RRC establishment cause that the UE may use in attempting to recover the connection. As shown, the UE may set the RRC establishment cause to mo-Data (e.g., based on access category 7, as shown in FIG. 14). The RRC establishment may be used by the network to prioritize the connection establishment request from various UEs (e.g., during high load situations in the network). In this scenario, indicating the cause as mo-Data may raise the risk of the UE not being able to send SOR/UPU acknowledgement. For example, the network may prioritize other access categories and/or RRC establishment causes (e.g., category 2 emergency or category 4 mo-VoiceCall) more than mo-Data, thus the UE's SOR/UPU acknowledgement may not be prioritized highly and may be delayed.

Either or both of the following changes in 24.501 may reduce or avoid the likelihood of such delay.

Change #1: In section, 4.5.1, note 4 may be replaced with the following: "NOTE 4: SOR acknowledgement or UPU acknowledgement transported in the UL NAS TRANSPORT message sent in response to a DL NAS Transport with SOR or UPU container shall be handled as MT access."

Change #2: The specification may be updated to indicate that SOR and/or UPU acknowledgement may be performed according to rule 1. For example, table 4.5.2.2 may be updated. FIG. 16 illustrates a table (e.g., similar to Table 4.5.2.2: Mapping table for access categories) showing additional text (underlined) as proposed, according to some embodiments.

In other words, the SOR or UPU acknowledgement may be treated as MT access, e.g., rather than as an MO access.

Figure 17:
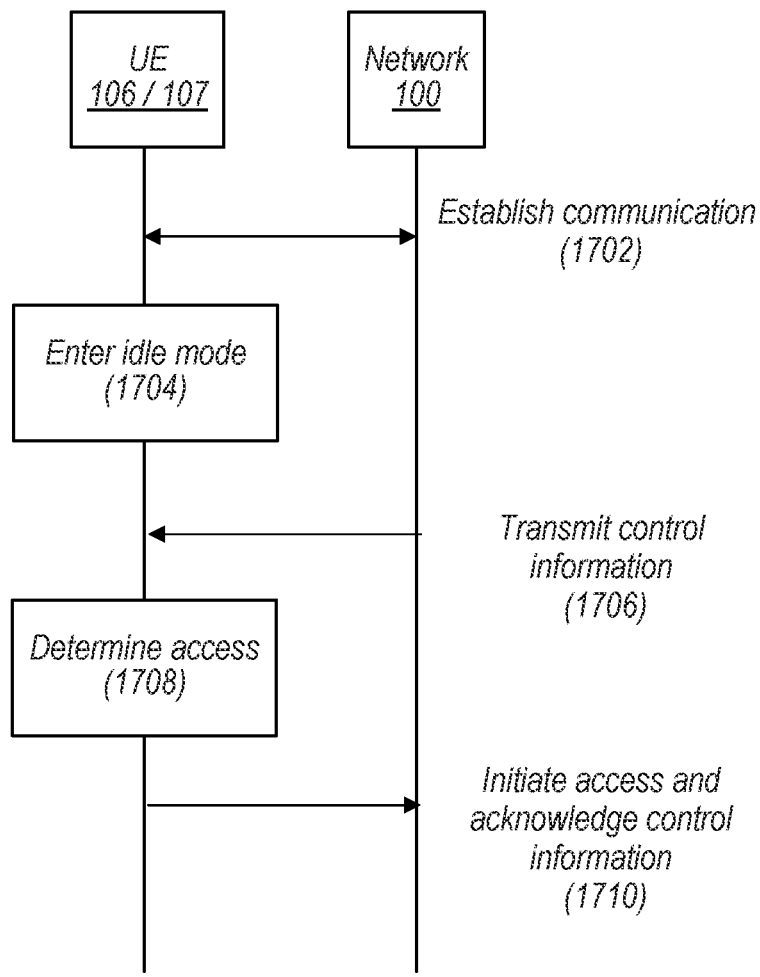

FIG. 17 is a communication flow diagram illustrating an example method for performing communication in context of unified access control, e.g., incorporating the changes to 24.501 discussed above, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 104 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

The UE and the network may establish communication (1702), according to some embodiments. The UE and the network may communicate using one or more radio access technologies (RATs), e.g., including NR. The UE and the network may communicate using one or more access category.

The UE may enter an idle mode (1704), according to some embodiments.

While the UE is in idle mode, the network may transmit control information to the UE (1706), according to some embodiments. The control information may include UPU and/or SOR, among various possibilities.

The UE may determine an access category to use to acknowledge the control information (1708), according to some embodiments. The UE may select the access category based on the type of control information. For example, in response to the control information including UPU and/or SOR, the UE may select a MT access category. For example, the UE may select access category 0 (indicating MT access) which may be associated with rule 1.

The UE may initiate access using the select access category (1710), according to some embodiments. The UE may use an RRC establishment cause associated with the rule and/or access category. For example, rule 1 and access category 0 may be associated with RRC establishment cause indicating priority access (e.g., mps-PriorityAccess, as shown in Table 4.5.6.1). The UE may acknowledge the control information. Further, the UE may implement the control information.

In some embodiments, the UE may exchange further data and/or control information with the network.

In some embodiments, the UE may return to idle mode.

Exceptions to Access Control

In TS 24.501's section 4.5.1, which deals with general aspects of unified access control, the specification describes certain events (e.g., listed 1 to 8) which may occur in connected mode. For the listed events, the UE may apply access control checks. The implication of the list is that for any other event in connected mode, the UE may not be subjected to access control checks.

However, TS 24.501's section 4.5.1 also includes the below note, which may create ambiguity by stating that 5GMM specific procedures initiated by NAS in 5GMM-CONNECTED mode are not subject to access control. Specifically, section 4.5.1 states: "NOTE 2: 5GMM specific procedures initiated by NAS in 5GMM-CONNECTED mode are not subject to access control, e.g. a registration procedure after PS handover will not be prevented by access control (see subclause 5.5)". Additionally, the specific procedures not being subject to access check may be currently associated with 5GMM-CONNECTED mode whereas the same may be applicable to 5GMM-CONNECTED mode with RRC Inactive. The latter may not be described by TS 24.501. Thus, 5GMM specific procedures for a UE in 5GMM-CONNECTED with RRC inactive are subject to UAC checks may lead to multiple issues. For example, a UE staying in 5GMM CONNECTED with RRC inactive while being in a sub-state other than 5GMM.REGISTERED-.NORMAL-SERVICE may lead to the UE becoming out of sync with the network. Similarly, a UE with changed capabilities may move to 5GMM.CONNECTED mode due to a network resuming suspended RRC connection in spite of the UE not having updated the network with its new capabilities, etc.

Since the specification already lists the events that are not subject to access control in connected mode, there may be no need to specifically mention skipping access control for 5GMM Specific procedures in connected mode. In other words, note 2 may create doubt as to what is the handling for common procedures and hence may be clarified. For example, note 2 may be edited to also account for common procedures and other procedures apart from ones already listed (e.g., events 1 to 8). Thus, section 4.5.1 may be revised to state (added text is underlined): "NOTE 2: 5GMM specific procedures and other procedures not listed in 1) to 8) above initiated by NAS in 5GMM-CONNECTED mode or 5GMM-CONNECTED mode with RRC inactive indication are not subject to access control, e.g. a registration procedure after PS handover will not be prevented by access control (see subclause 5.5)".

Thus, a UE may enter a connected mode and perform a procedure other than those procedures explicitly listed in TS 24.501's section 4.5.1. The UE may not perform/evaluate access control for the procedure. In other words, while in connected mode, the UE may not constrain its procedures based on access control.

Additional Information and Embodiments

In various embodiments, various combinations of the adaptations described above may be performed together. For example, the network may send control information to a UE to cause the UE to process downlink RS according to embodiments discussed above and to transmit uplink RS according to embodiments discussed above.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a radio; and
a processor operably connected to the radio and configured to cause the UE to:
establish communication with a cellular network;
initiate a radio capability update using an access category associated with signaling;
determine that the access category associated with signaling is barred;
receive, while the radio capability update is pending, a message, wherein the message is one of:
a page; and
a notification message;
determine whether a mobile terminated (MT) access category associated with the message is barred; and
in response to a determination that the MT access category associated with the message is not barred, access the cellular network according to the access category associated with the message; or
in response to a determination that the MT access category associated with the message is barred, determine not to access the cellular network in response to the message.

2. The UE of claim 1, wherein the processor is further configured to cause the UE to disable a radio access technology, wherein initiating the radio capability update is in response to disabling the radio access technology.

3. The UE of claim 1, wherein the processor is further configured to cause the UE to enter an update-needed substate in response to the determination that the MT access category associated with signaling is barred.

4. The UE of claim 1, wherein, while the radio capability update is pending, the processor is further configured to cause the UE to operate in a 5GMM-REGISTERED.UPDATE-NEEDED substate.

5. The UE of claim 1, wherein the radio capability update includes a radio capability change.

6. The UE of claim 1, wherein the processor is further configured to cause the UE to determine that the radio capability update is associated with a periodic registration, wherein to access the cellular network according to the MT access category associated with the message comprises initiating a service request.

7. The UE of claim 6, wherein the determination that the radio capability update is associated with the periodic registration is based on expiration of a timer.

8. The UE of claim 1, wherein the processor is further configured to cause the UE to determine that the radio capability update is not associated with a periodic registration, wherein to access the cellular network according to the MT access category associated with the message comprises initiating a mobility registration.

9. The UE of claim 1, wherein determining that the MT access category associated with the message is not barred is in response to a determination that the MT access category associated with the message is not the same as an access category associated with mobile originated signaling.

10. The UE of claim 1, wherein the processor is further configured to cause the UE to enter a 5GMM-CONNECTED mode with a radio resource control (RRC) inactive indication.

11. A baseband processor comprising circuitry configured to:
establish communication with a cellular network;
initiate a radio capability update using an access category associated with signaling;
determine that the access category associated with signaling is barred;
receive, while the radio capability update is pending, a message, wherein the message is one of:
a page; and
a notification message;
determine whether a mobile terminated (MT) access category associated with the message is barred; and
in response to a determination that the MT access category associated with the message is not barred, access the cellular network according to the access category associated with the message; or
in response to a determination that the MT access category associated with the message is barred, determine not to access the cellular network in response to the message.

12. The baseband processor of claim 11, wherein the circuitry is further configured to enter a 5GMM-CONNECTED mode with a radio resource control (RRC) inactive indication.

13. The baseband processor of claim 11, wherein the radio capability update includes a radio capability change.

14. The baseband processor of claim 11, wherein determining that the MT access category associated with the message is not barred is in response to a determination that the MT access category associated with the message is not the same as an access category associated with mobile originated signaling.

15. The baseband processor of claim 11, wherein the circuitry is further configured to disable a radio access technology, wherein initiating the radio capability update is in response to disabling the radio access technology.

16. A method, comprising:
establish communication with a cellular network;
initiate a radio capability update using an access category associated with signaling;

determine that the access category associated with signaling is barred;
receive, while the radio capability update is pending, a message, wherein the message is one of:
a page; and
a notification message;
determine whether a mobile terminated (MT) access category associated with the message is barred; and
in response to a determination that the MT access category associated with the message is not barred, access the cellular network according to the access category associated with the message; or
in response to a determination that the MT access category associated with the message is barred, determine not to access the cellular network in response to the message.

17. The method of claim 16, further comprising:
enter a 5GMM-CONNECTED mode with a radio resource control (RRC) inactive indication.

18. The method of claim 16, wherein the radio capability update includes a radio capability change.

19. The method of claim 16, wherein determining that the MT access category associated with the message is not barred is in response to a determination that the MT access category associated with the message is not the same as an access category associated with mobile originated signaling.

20. The method of claim 16, further comprising:
disable a radio access technology, wherein initiating the radio capability update is in response to disabling the radio access technology.

* * * * *